(12) United States Patent
Kim

(10) Patent No.: US 11,092,741 B2
(45) Date of Patent: Aug. 17, 2021

(54) ATHERMAL ARRAYED WAVEGUIDE GRATING USING PRECISE PARALLEL MOVEMENT MODULE, AND MANUFACTURING METHOD THEREFOR

(71) Applicant: Polslab Inc., Gwangju (KR)

(72) Inventor: Jin Bong Kim, Gwangju (KR)

(73) Assignee: Polslab Inc., Gwangju (KR)

( * ) Notice: Subject to any disclaimer, the term of this patent is extended or adjusted under 35 U.S.C. 154(b) by 0 days.

(21) Appl. No.: 16/964,310

(22) PCT Filed: Jan. 16, 2019

(86) PCT No.: PCT/KR2019/000648
§ 371 (c)(1),
(2) Date: Jul. 23, 2020

(87) PCT Pub. No.: WO2019/146953
PCT Pub. Date: Aug. 1, 2019

(65) Prior Publication Data
US 2021/0041626 A1 Feb. 11, 2021

(30) Foreign Application Priority Data
Jan. 24, 2018 (KR) .......... 10-2018-0008858

(51) Int. Cl.
*G02B 6/10* (2006.01)
*G02B 6/12* (2006.01)
*G02B 6/13* (2006.01)

(52) U.S. Cl.
CPC .......... *G02B 6/1203* (2013.01); *G02B 6/13* (2013.01); *G02B 6/12* (2013.01)

(58) Field of Classification Search
CPC .......... G02B 6/1203; G02B 6/13; G02B 6/12; G02B 2006/12107
See application file for complete search history.

(56) References Cited

U.S. PATENT DOCUMENTS

| 6,456,763 B2 * | 9/2002 | Kashihara | G02B 6/1203 385/37 |
| 6,735,364 B2 * | 5/2004 | Kashihara | G02B 6/1203 385/129 |

(Continued)

FOREIGN PATENT DOCUMENTS

| KR | 10-2002-0070459 A | 9/2002 |
| KR | 10-2005-0010076 A | 1/2005 |

(Continued)

*Primary Examiner* — Ellen E Kim
(74) *Attorney, Agent, or Firm* — Blank Rome LLP

(57) ABSTRACT

A temperature compensation module mounted in an arrayed waveguide grating (AWG) comprises a base attached to the AWG and a moving member attached to the base, wherein the base comprises: a first fixing part attached to a first sub chip of the AWG; a second fixing part attached to a second sub chip of the AWG; a hole which is a gap between the first fixing part and the second fixing part, and is disposed to include, within the gap, a cut surface for dividing the AWG into the first sub chip and the second sub chip; and a 'ㄹ'-shaped elastic part, wherein the moving member is attached to the first fixing part so as to horizontally move the first sub chip of the AWG in the direction of decreasing central wavelength changes caused by temperature changes.

15 Claims, 14 Drawing Sheets

(56) References Cited

U.S. PATENT DOCUMENTS

| | | | | |
|---|---|---|---|---|
| 6,738,545 B1* | 5/2004 | Purchase | ............ | G02B 6/12011 385/14 |
| 6,954,566 B2* | 10/2005 | Johannessen | ...... | G02B 6/12014 385/37 |
| 7,062,127 B2* | 6/2006 | Purchase | ............ | G02B 6/12011 385/14 |
| 8,494,319 B2* | 7/2013 | Okamoto | ............. | G02B 6/1203 385/37 |
| 2002/0085808 A1* | 7/2002 | Ooyama | ............ | G02B 6/12021 385/37 |
| 2002/0181871 A1* | 12/2002 | Saito | .................. | G02B 6/12033 385/37 |
| 2008/0135169 A1* | 6/2008 | Rhee | .................. | G02B 6/12016 156/256 |
| 2010/0278483 A1* | 11/2010 | Hasegawa | ........... | G02B 6/1203 385/37 |
| 2012/0195553 A1* | 8/2012 | Hasegawa | .......... | G02B 6/12014 385/37 |
| 2015/0309257 A1* | 10/2015 | Huang | ............... | G02B 6/12026 385/14 |

FOREIGN PATENT DOCUMENTS

| | | |
|---|---|---|
| KR | 10-2006-0025984 A | 3/2006 |
| KR | 10-2006-0112697 A | 11/2006 |
| KR | 10-1338963 B1 | 12/2013 |
| WO | WO 2005/114288 A1 | 12/2005 |
| WO | WO 2006/073229 A1 | 7/2006 |
| WO | WO 2008/044838 A1 | 4/2008 |

* cited by examiner

ATHERMAL ARRAYED WAVEGUIDE GRATING USING PRECISE PARALLEL MOVEMENT MODULE, AND MANUFACTURING METHOD THEREFOR

BACKGROUND OF THE INVENTION

1. Field of the Invention

The present disclosure relates to athermal arrayed waveguide grating (AWG) using a precise parallel movement module and a manufacturing method therefor, and more particularly, to athermal arrayed waveguide grating (AWG) with a temperature compensation module capable of precise horizontal movement to uniformly maintain the wavelength irrespective of outside temperature changes and a manufacturing method therefor.

2. Description of the Related Art

Recently, with the dramatic increase in different types of data services including is the Internet, transmission capacity expansion of the backbone network is required. To meet the demand, one of solutions is to increase the transmission capacity of optical fibers through wavelength division multiplexing (WDM) optical communication systems that receive and transmit multiple channels of information through a single optical fiber.

In the WDM, planar lightwave circuits (PLCs) having optical waveguides on a plate of silica by a combination of optical fiber technology and large scale integration (LSI) technology are used as wavelength division multiplexers/demultiplexers. The PLC (e.g., arrayed waveguide gratings (AWGs), splitters) changes in refractive index n with the changes in temperature T, and in the case of AWGs for wavelength division, the changes in refractive index n lead to changes in the path L of light that determines the wavelength, and changes in wavelength λ occur in the channel of each output port. Hereinafter, a general AWG will be described with reference to FIG. 1.

FIG. 1 illustrates the structure of the general AWG. As shown in FIG. 1, the AWG includes an input waveguide 1, an input slab waveguide 2, an array waveguide 3, an output slab waveguide 4 and an output waveguide 5. Actually, there is one input waveguide 1 defining an optical path, but at least one input waveguide 1 may be included to monitor the performance in the fabrication process. An optical signal inputted to the input waveguide 1 is split at each wavelength λ1, λ2, . . . , λn and outputted to the output waveguide 5. That is, when wavelength λ1 is allocated to #1 channel, it is necessary that the wavelength λ1 is outputted to the output waveguide 5 despite changes in the surrounding environment. However, the refractive index changes with temperature, and as the refractive index changes, the wavelength of the AWG changes as well. Although the wavelength λ1 is allocated to #1 channel, as the temperature changes, an error may occur, for example, wavelength λ2 may be outputted.

In the use of the AWG as a wavelength division multiplexer, to prevent the error caused by the temperature change, packaging has been used to maintain uniform temperature at high temperature above the operating temperature using a precision heater. However, due to the problems with power consumption, outdoor power supply and high temperature-induced product's short life, studies have been made on athermal AWG structures for uniformly maintaining the wavelength irrespective of the temperature of the AWG itself.

Referring to FIG. 1, a cutting plane 6 for dividing a substrate into two parts 10a, 10b is included to compensate for temperature changes. As opposed to linear changes in wavelength at the output port with temperature, the AWG of FIG. 1 compensates for wavelength with the changes in temperature to prevent the changes in wavelength at the output port by allowing the first sub chip 10a including the input waveguide 1 to move along the cutting plane 6. To move the position of the input waveguide 1 cut in a straight line, a material having the coefficient of thermal expansion that matches the change in wavelength is machined and used, and such a material is referred to as a temperature compensation material or a thermal compensation material and primarily includes metals having a high coefficient of thermal expansion.

The PLC that is one of optical communication components requires very precise alignment with the alignment tolerance of 0.5 microns. Re-aligning the first sub chip 10a and the second sub chip 10b of the AWG cut to achieve temperature insensitivity within the tolerance causes a challenging technical problem.

SUMMARY OF THE INVENTION

The present disclosure is directed to providing athermal arrayed waveguide grating (AWG) in which a cutting plane is aligned within the tolerance using a temperature compensation module capable of precise horizontal movement to facilitate the alignment of the cutting plane of the athermal AWG and a manufacturing method therefor.

To achieve the above-described object, according to an aspect of the present disclosure, there is provided a temperature compensation module mounted in arrayed waveguide grating (AWG) to manually compensate for outside temperature changes, the temperature compensation module including a base that is attached to the AWG and a moving member that is attached to the base, wherein the base includes a first fixing part that is attached to a first sub chip including an input waveguide of the AWG, a second fixing part that is attached to a second sub chip including an input slab waveguide of the AWG, a hole being a gap between the first fixing part and the second fixing part, the hole disposed to include a cutting plane within the gap, the cutting plane for separating the AWG into the first sub chip and the second sub chip, and a 'ㄹ'-shaped elastic part to assist a linear movement of the first fixing part and connect the first fixing part and the second fixing part, and the moving member is attached to the first fixing part to horizontally move the first sub chip of the AWG in a direction of reducing a change in center wavelength with a change in temperature.

According to an embodiment of the present disclosure, the base may be extended to a sufficient size to receive the entire AWG chip. That is, it is possible to change to a substrate integrated compensation module for receiving the entire AWG chip.

According to an embodiment of the present disclosure, each of the first fixing part and the second fixing part may include a slit being a protruding plane to apply an adhesive for fixing the AWG, and a dam having a recessed shape to isolate the slit to prevent the adhesive from flowing.

According to an embodiment of the present disclosure, the base may include an upper base plate that is attached to the AWG, and a lower base plate formed on a surface opposite a surface of the upper base plate where the AWG is attached, one end of the moving member being attached to the lower base plate.

According to an embodiment of the present disclosure, the upper base plate and the lower base plate may be integrally formed.

According to an embodiment of the present disclosure, the lower base plate may include a guide hole for guiding a linear movement of the moving member.

According to an embodiment of the present disclosure, the moving member may be made of a material having a higher coefficient of thermal expansion than the base, and the base may be made of one of metal, plastic, silicon and silica-based materials having a lower coefficient of thermal expansion than the moving member.

According to another aspect of the present disclosure, there is provided an athermal AWG including an AWG planar substrate including an input waveguide, an input slab waveguide, an array waveguide, an output slab waveguide and an output waveguide, wherein a temperature compensation module is mounted on or below the planar substrate, the temperature compensation module includes a base that is attached to the AWG and a moving member that is attached to the base, the base includes a first fixing part and a second fixing part, each attached with the AWG and separated from each other, a hole being a gap between the first fixing part and the second fixing part, and a '彐'-shaped elastic part to assist a linear movement of the first fixing part and connect the first fixing part and the second fixing part, and the moving member is attached to the first fixing part to horizontally move in a direction of reducing a change in center wavelength with a change in temperature of the AWG.

According to an embodiment of the present disclosure, the planar substrate may be separated into a first sub chip including the input waveguide and a second sub chip including the input slab waveguide by a cutting plane formed between the input waveguide and the input slab waveguide or inside the input slab waveguide.

According to an embodiment of the present disclosure, the first fixing part may be attached to the first sub chip, the second fixing part may be attached to the second sub chip, and the moving member may be attached to the first fixing part to allow the first sub chip to make a parallel movement along the cutting plane.

According to still another aspect of the present disclosure, there is provided a method for manufacturing an athermal AWG using a temperature compensation module, the method including preparing an AWG planar substrate including an input waveguide, an input slab waveguide, an array waveguide, an output slab waveguide and an output waveguide, placing the temperature compensation module on or below the AWG, and attaching the temperature compensation module to the AWG, wherein the temperature compensation module includes a base that is attached to the AWG and a moving member that is attached to the base, the base includes a first fixing part and a second fixing part, each attached with the AWG and separated from each other, a hole being a gap between the first fixing part and the second fixing part, and a '彐'-shaped elastic part to assist a linear movement of the first fixing part and connect the first fixing part and the second fixing part, and the moving member is attached to the first fixing part to horizontally move in a direction of reducing a change in center wavelength with a change in temperature of the AWG.

According to an embodiment of the present disclosure, placing the temperature compensation module on or below the AWG may include placing a cutting plane within the hole, the cutting plane for separating the AWG into a first sub chip including the input waveguide and a second sub chip including the input slab waveguide.

According to an embodiment of the present disclosure, the method may further include cutting between the input waveguide and the input slab waveguide or into the input slab waveguide to separate the AWG into a first sub chip including the input waveguide and a second sub chip including the input slab waveguide.

According to an embodiment of the present disclosure, attaching the temperature compensation module to the AWG may include attaching the first fixing part to the first sub chip and the second fixing part to the second sub chip.

According to an embodiment of the present disclosure, attaching the temperature compensation module to the AWG may include applying an adhesive to a slit, wherein the slit is a protruding plane from each of the first fixing part and the second fixing part, and attaching the slit of the first fixing part to the first sub chip and the slit of the second fixing part to the second sub chip, wherein each of the first fixing part and the second fixing part includes a dam having a recessed shape to isolate the slit to prevent the adhesive from flowing.

The present disclosure thus provides athermal arrayed waveguide grating (AWG) that facilitates the alignment of the cutting plane of the AWG and achieves precise horizontal movement without a change in vertical gap and difference of the cutting plane through the temperature compensation module capable of precise horizontal movement. Through this, it is possible to easily apply the thermal compensation material to both the upper and lower ends in motion, and uniformly maintain the center wavelength of the AWG device irrespective of temperature changes. Additionally, it is possible to simplify the fabrication process by simply attaching one modularized temperature compensation module to the chip, and ultimately, increase the reliability and productivity of products.

The effects that can be obtained from the present disclosure are not limited to the above-mentioned effects, and other effects not mentioned herein will be clearly understood by those having ordinary skill in the art from the following description.

DETAILED DESCRIPTION OF THE PREFERRED EMBODIMENTS

Figure 1:
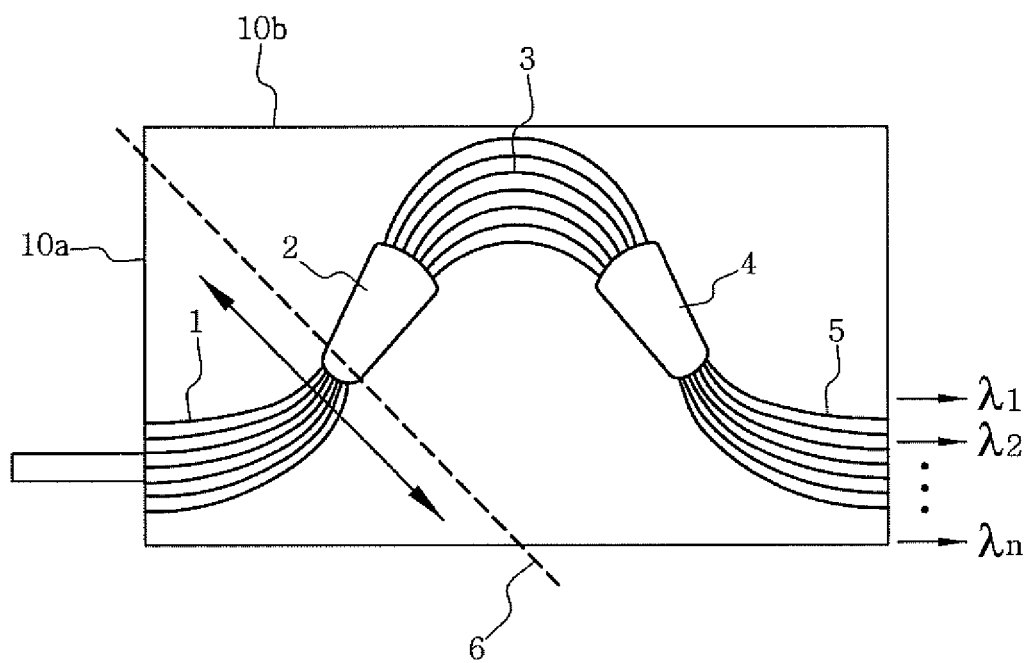
FIG. 1 illustrates a general arrayed waveguide grating (AWG) structure according to an embodiment of the present disclosure.

These and other advantages and features of the present disclosure and methods for achieving them will be apparent by referring to the embodiments described in detail below together with the accompanying drawings. However, the present disclosure is not limited to the following disclosed embodiments and will be embodied in many different forms, and these embodiments are only provided to make the disclosure complete and help those having ordinary skill in the technical field pertaining to the present disclosure to understand the scope of the invention fully, and the present disclosure is only defined by the scope of the appended claims.

The shape, size, proportion, angle and number shown in the drawings to describe the embodiments of the present disclosure are provided by way of illustration, and the present disclosure is not limited thereto. Additionally, in describing the present disclosure, when it is deemed that a certain detailed description of well-known related technology renders the key subject matter of the present disclosure unnecessarily ambiguous, the detailed description is omitted herein. The term 'comprises' or 'includes' as used herein does not preclude the presence or addition of other components unless 'only' is used. The singular forms as used herein include the plural forms as well unless the context clearly indicates otherwise.

In interpreting the components, unless the context clearly indicates otherwise, it is interpreted that an error range is included.

In the description of the positional relationship, for example, when the positional relationship of two components is described using 'on', 'above', 'below', 'next to', unless 'immediately' or 'directly' is used, at least one intervening component may be present.

When an element or layer is referred to as being "on" another element or layer, the element or layer may be immediately on another element or layer, or intervening element(s) or layer(s) may be present. Like reference symbols indicate like components throughout the specification.

The terms "first", "second", and the like are used to describe various components, but it is obvious that these components are not limited by the terms. These terms are used to distinguish one component from another. Accordingly, it is obvious that a first component as used herein may be a second component in the technical spirit of the present disclosure.

The size and thickness of each component in the drawings is shown for convenience of description, and the present disclosure is not necessarily limited to the size and thickness of the components shown in the drawings.

Each feature of the embodiments of the present disclosure may be united or combined together in part or in whole, and as sufficiently understood by those having ordinary skill in the art, a variety of technical connection and cooperation are possible, and each embodiment may be carried out independently of each other or in conjunction with each other.

The athermal AWG according to an embodiment of the present disclosure is cut between an input waveguide 1 and an input slab waveguide 2 or into the input slab waveguide 2 to compensate for changes in the center wavelength by changing the location of incoming light with the changes in temperature. To this end, the structure of a temperature compensation module for easy alignment of the cutting plane of the athermal AWG and precise horizontal movement with the expansion/contraction of a thermal compensation material is shown in FIGS. 2 to 5 below.

Figure 2:
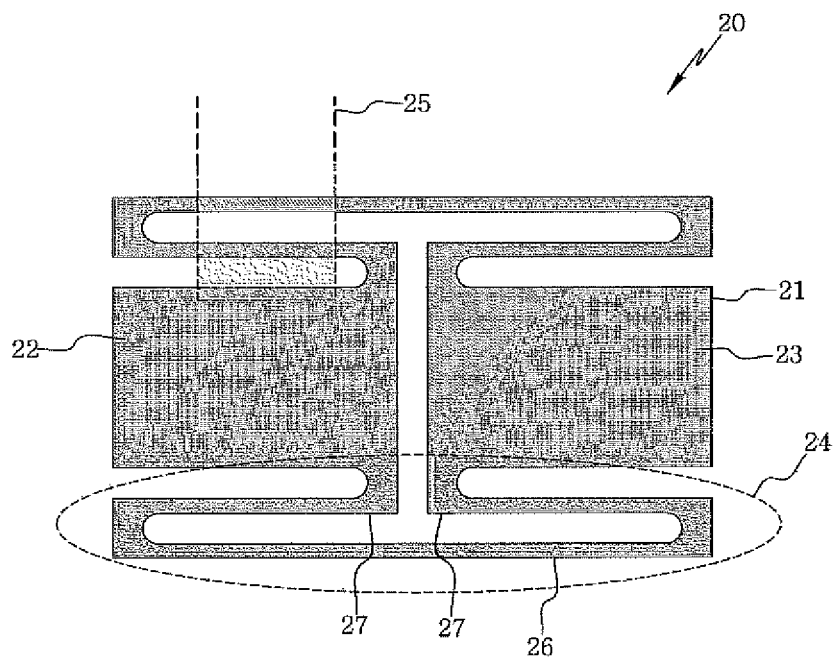
FIG. 2 illustrates the basic structure of a temperature compensation module according to an embodiment of the present disclosure.

FIG. 2 illustrates the basic structure of the temperature compensation module 20 according to an embodiment of the present disclosure.

Referring to FIG. 2, the basic structure of the temperature compensation module 20 according to an embodiment of the present disclosure includes a base 21 and a moving member 25.

The base 21 is attached to an AWG substrate to facilitate the alignment between the cut parts of the AWG and assist the precise horizontal movement of the cut part of the AWG with the expansion and contraction of the moving member 25 attached to a portion of the base 21. To this end, the base 21 includes a first fixing part 22, a second fixing part 23 and an elastic part 24 connecting the first fixing part 22 and the second fixing part 23. According to an embodiment of the present disclosure, preferably, the base 21 may be integrally formed by machining such that the base 21 includes the first fixing part 22, the second fixing part 23 and the elastic part 24 from one raw material, and is easy to machine in order to change the shape. When the base 21 is made of a material having a large difference in coefficient of thermal expansion from the moving member 25 of the thermal compensation material, it is possible to maximize the temperature compensation effect. For example, in general, the moving member 25 uses a metal having a high coefficient of thermal expansion. The base 21 may be made of, for example, metal, plastic, silicon and silica-based materials having a lower coefficient of thermal expansion. According to an embodiment of the present disclosure, the base 21 may be made of the same material as the AWG substrate. Through this, it is possible to prevent twists due to different coefficients of thermal expansion when the base 21 and the AWG substrate are attached.

The first fixing part 22 and the second fixing part 23 may be fixed and attached to the AWG. For example, an adhesive such as epoxy may be used to fix and attach the first fixing part 22 and the second fixing part 23 to the AWG chip, but fixing is not necessarily conducted only by the adhesive. Various types of members may be used to fix and attach the first fixing part 22 and the second fixing part 23 to the AWG chip. According to an embodiment of the present disclosure, the moving member 25 is attached to the first fixing part 22 to cause linear movements of the separated part of the AWG through expansion/contraction with temperature, and through this, to compensate for changes in the optical properties with temperature.

The elastic part 24 may be formed with elasticity such that the elastic part 24 deforms to make linear movements as the moving member 25 expands/contracts, but restores to the original shape. For example, the elastic part 24 may be in the shape of a leaf spring, and may include a support 26 machined in a very small thickness and a leg 27 connecting two ends of the support 26 to the first fixing part 22 and the second fixing part 23 respectively. The support 26 and the horizontal portion of the leg 27 parallel to the support 26 may be machined in a very small thickness such that they have the width of a few mm or less according to the required elasticity. FIG. 2 only shows a structure in which the leg 27 connects the fixing parts 22, 23 to the support 26 at a right angle in the shape of 'ㄹ', but this is provided by way of illustration, any shape that assists the linear movement of the fixing part with elasticity is possible. For example, the upper and lower plates (the first and second fixing parts) with the shaped elastic part 24 connected on the left and right sides in a symmetrical structure achieve precise horizontal movements due to offset of two circular movements. At the same time, the elastic part 24 of vertically thick structure suppresses vertical movements, so there is almost no change in vertical difference when the upper and lower plates make horizontal movements. That is, the elastic part 24 may be about a few mm in thickness, thereby suppressing vertical movements.

Figure 3:
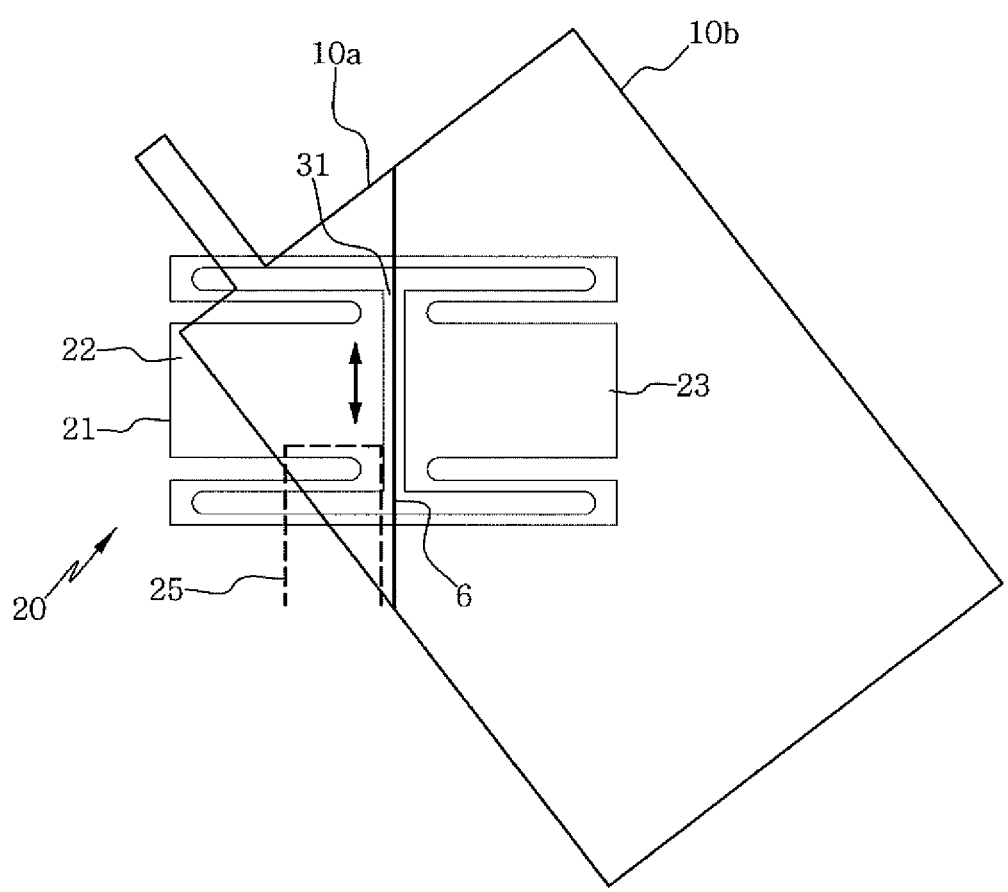
FIG. 3 illustrates the alignment of a temperature compensation module and AWG according to an embodiment of the present disclosure.

FIG. 3 illustrates the alignment of the temperature compensation module 20 and the AWG according to an embodiment of the present disclosure.

Referring to FIG. 3, when the base 21 of the temperature compensation module 20 is fixed and attached to the AWG, the first fixing part 22 may be attached to the first sub chip 10a, and the second fixing part 23 may be attached to the second sub chip 10b. For example, an adhesive such as epoxy may be used to fix and attach the first fixing part 22 and the second fixing part 23 to the AWG chip, but fixing is not necessarily conducted only by the adhesive. In this instance, the base 21 of the temperature compensation module 20 may be attached on or below the AWG. The cutting plane 6 of the AWG may be formed by cutting between the input waveguide 1 and the input slab waveguide 2, or may be formed inside the input slab waveguide 2, and accordingly, the first sub chip 10a of the AWG includes the input waveguide 1, and the second sub chip 10b includes the input slab waveguide 2.

The base 21 of the temperature compensation module 20 includes a hole 31 between the first fixing part 22 and the second fixing part 23 to allow the first fixing part 22 and the second fixing part 23 to move separately from each other. According to an embodiment of the present disclosure, the temperature compensation module 20 and the AWG are placed in alignment such that the cutting plane 6 of the AWG is included in is the hole 31 to allow the first sub chip 10a to move separately from the second sub chip 10b. The base 21 may be integrally formed by machining from one raw material, and for this reason, may be a structure in which the height of the first sub chip 10a, i.e., a region including the input waveguide 1 accurately matches the height of the second sub chip 10b, i.e., a region including the input slab waveguide 2.

For example, as shown in FIG. 3, when the center line of the hole 31 and the cutting plane 6 of the AWG are placed in alignment, and the first fixing part 22 is fixed to the first sub chip 10a and the second fixing part 23 is fixed to the second sub chip 10b, the first sub chip 10a fixed to the first fixing part 22 horizontally moves with the expansion/contraction of the moving member 25 attached to the first fixing part 22. In this instance, the horizontal movements are assisted by the elastic part 24, and it is possible to manufacture the athermal AWG that can move within the alignment tolerance (for example, 0.0005 mm). For example, the first and second fixing parts with the '⇄' shaped elastic part 24 connected on the left and right sides in a symmetrical structure achieve precise horizontal movements due to offset of two circular movements. Additionally, the elastic part 24 of vertically thick structure (for example, a few mm) suppresses vertical movements, so it is possible to achieve precise horizontal movements with almost no change in vertical difference when the upper and lower plates make horizontal movements.

According to an embodiment of the present disclosure, the step of cutting the AWG into the first sub chip 10a and the second sub chip 10b in the process of manufacturing the athermal AWG may be performed before attaching the temperature compensation module 20 to the AWG. However, the manufacturing process is not necessarily performed in such an order, and the athermal AWG may be manufactured in a simple manner by attaching the temperature compensation module 20 to the AWG and cutting the AWG such that the cutting plane 6 is disposed in the hole of the temperature compensation module 20.

Figure 4A:
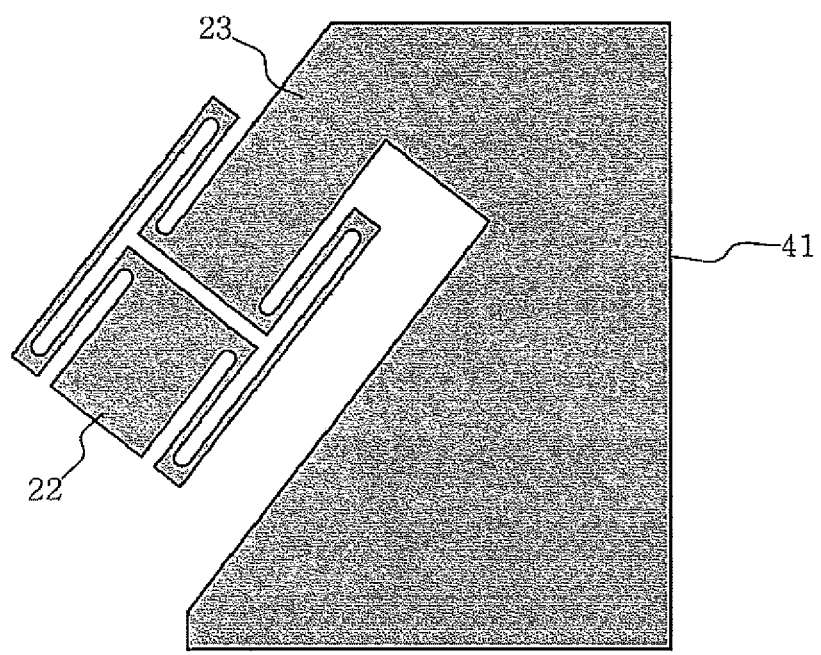
FIGS. 4A to 4F illustrate the structure of a first modified form of a temperature compensation module according to an embodiment of the present disclosure.
Figure 4B:
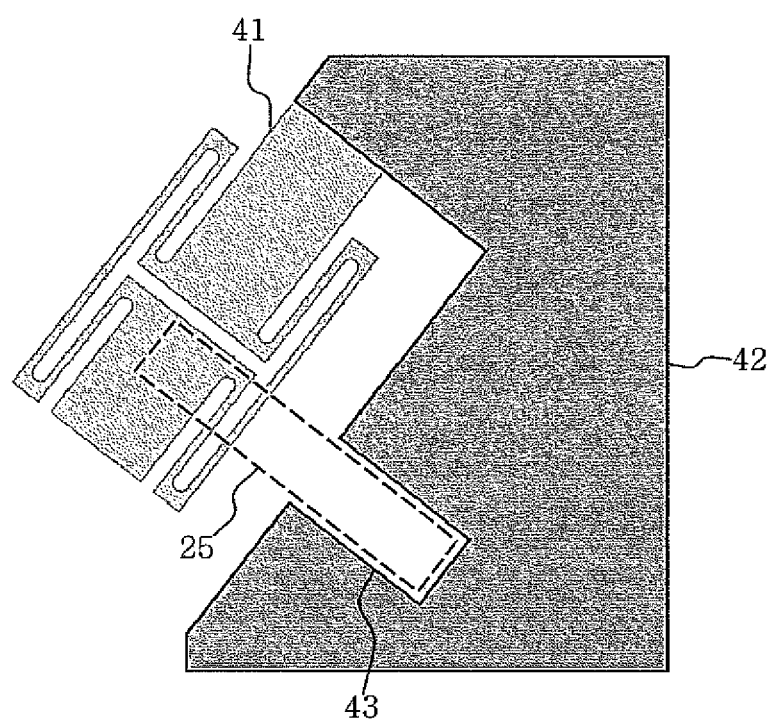

FIGS. 4A and 4B illustrate the upper and lower plate structure of a first modified form of the temperature compensation module 20 according to an embodiment of the present disclosure.

Referring to FIGS. 4A and 4B, the first modified form of the temperature compensation module 20 is formed with a structure in which the second fixing part 23 extends from the basic form of the base and two ends of the moving member 25 are fixed and attached to the integrally formed upper base plate 41. According to an embodiment of the present disclosure, the upper base plate 41 may be attached on or below the AWG, and the lower base plate 42 may be attached to a surface opposite the upper base plate 41 where the AWG is attached. One end of the moving member 25 is fixed to the first fixing part 22, and the other end is fixed to the lower base plate 42. The lower base plate 42 may further include a guide hole 43 to guide the horizontal movement of the moving member 25. Even though the lower base plate 42 is placed in contact with the ground, to prevent the expansion/contraction of the moving member 25 from being interrupted, the thickness of the lower base plate 42 may be larger than the thickness of the moving member 25, and the two ends of the moving member 25 may be fixed to the upper base plate 41 and the lower base plate 42 respectively to prevent the contact with the ground in the guide hole 43. According to another embodiment, the upper and lower base plates may be integrally formed as shown in FIGS. 4A and 4B.

Figure 4C:
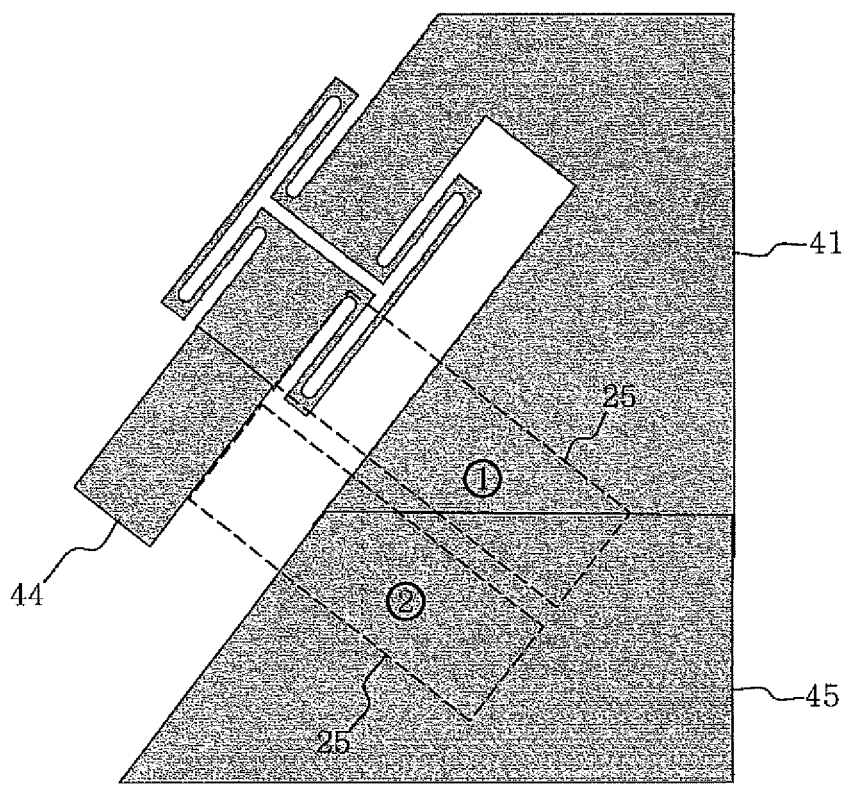

According to various embodiments of the present disclosure, FIG. 4C illustrates a variation of the first modified form of the temperature compensation module 20 including the upper base plate 41 alone. Referring to FIG. 4C, the moving member 25 may be directly fixed to the upper base plate 41 without separately fabricating a lower base plate of a different shape from the upper base plate 41. The moving member 25 may be mounted in a first position ① where the two ends of the moving member 25 are fixed to the first fixing part 22 and the upper base plate 41 parallel to the first fixing part 22 respectively, or a second position ② where the two ends of the moving member 25 are fixed to an extension 44 of the first fixing part 22 and an extension 45 at the lower end of the upper base plate 41 respectively.

Figure 4D:
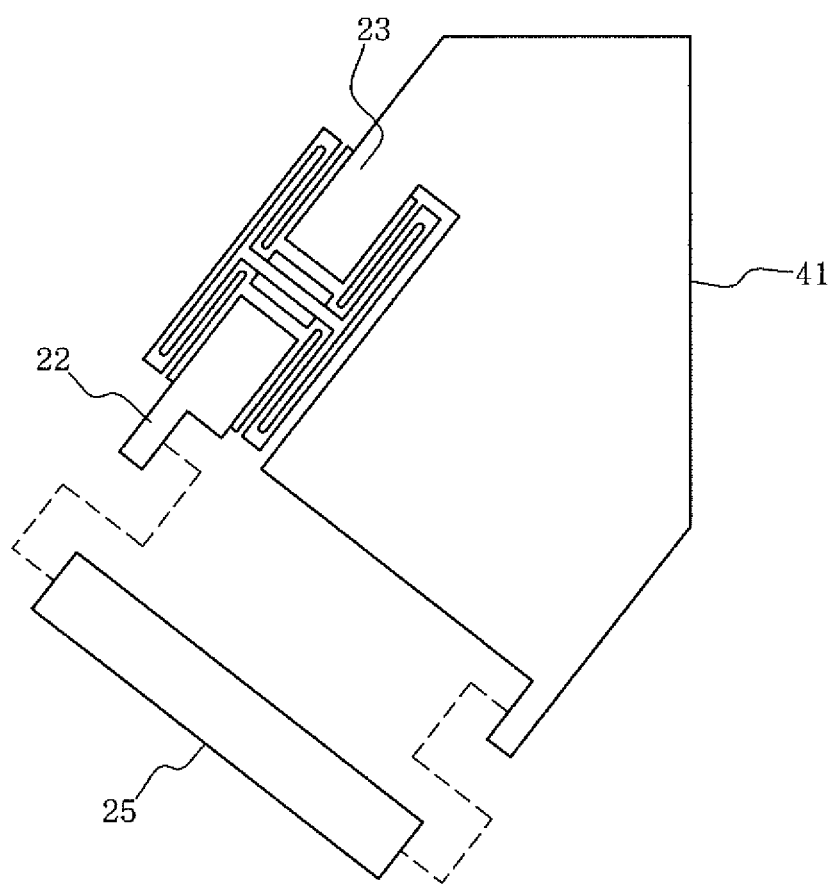
Figure 4E:
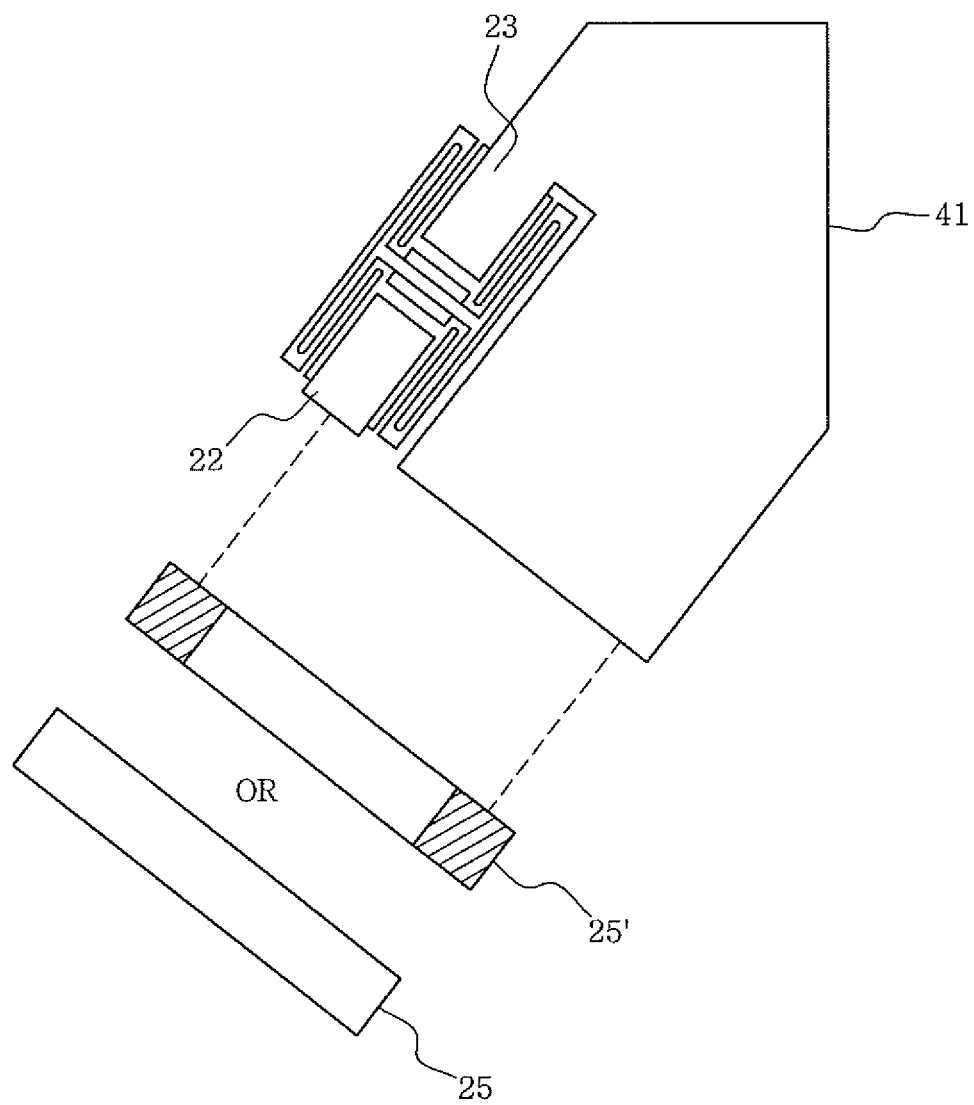
Figure 4F:
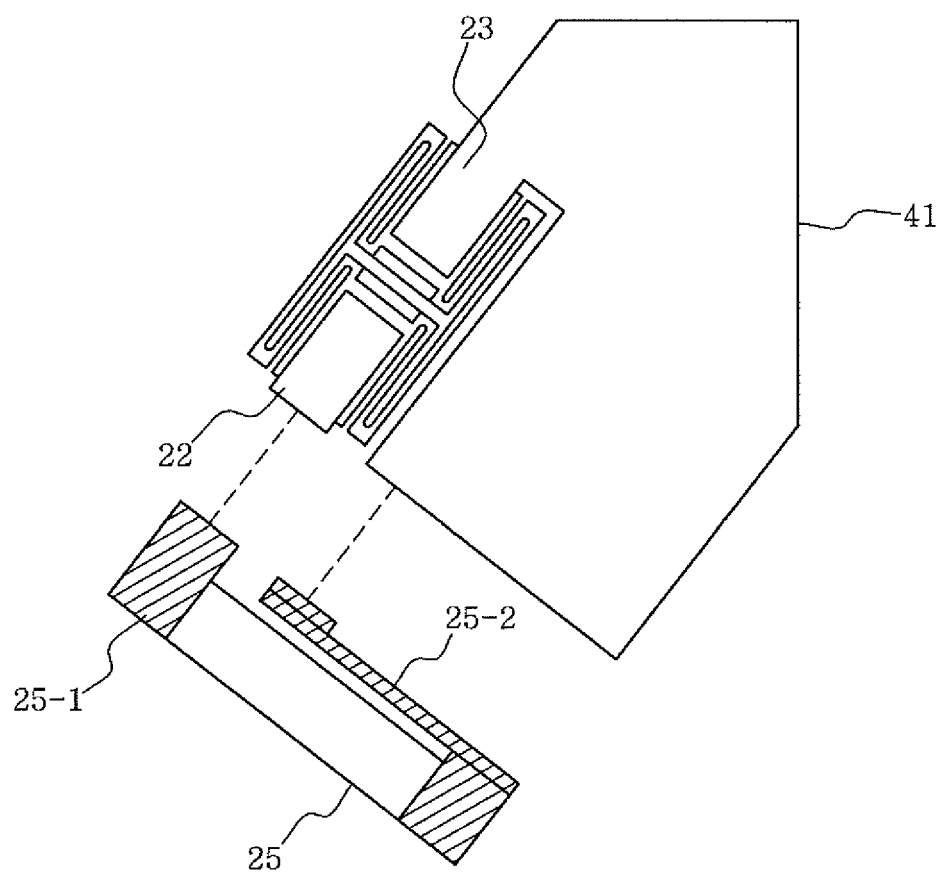

According to various embodiments of the present disclosure, FIGS. 4D to 4F illustrate other variations of the first modified form of the temperature compensation module 20 including the upper base plate 41 alone.

Referring to FIG. 4D, the moving member 25 is directly fixed to the upper base plate 41 without separately fabricating a lower base plate of a different shape from the upper base plate 41. Particularly, the first fixing part 22 and the upper base plate 41 may be machined with a structure for mounting the moving member 25 such that the two ends of the moving member 25 may be fixed and mounted in a recessed area of the first fixing part 22 and a recessed area at the lower end of the upper base plate 41 respectively. For example, the moving member 25 may be formed with a structure in which the moving member 25 is fixed with screws at two ends, or the moving member 25 itself may be fabricated in the shape of a large screw. The moving member 25 may be fixed to the base in a simple manner by tightening the screw, and the chip may be aligned to a desired location.

Referring to FIG. 4E, as shown in FIG. 4D, the first fixing part 22 and the upper base plate 41 may be fabricated in a linear shape as conventional without separately machining adhesion regions for the moving member 25. The two ends of the moving member 25 may be fixed and mounted to the end of the first fixing part 22 and the lower end of the upper base plate 41 parallel thereto, respectively. In this instance, the moving member 25 may be a moving member 25 that is made of only a thermal compensation material and is attached, or a moving member 25' with attaching parts of different materials connected to the two ends of the thermal compensation material. The attaching parts of different materials at the two ends of the thermal compensation material may be the same material as the first fixing part 22 and the upper base plate 41, and may be made of metal, plastic, silicon or silica-based materials.

Referring to FIG. 4F, as shown in FIG. 4E, the first fixing part 22 and the upper base plate 41 may be fabricated in a linear shape as conventional without separately machining adhesion regions for the moving member 25, but the moving member 25 may have a different shape. In this instance, the moving member 25 may include a first attaching part 25-1 connected to one end of the thermal compensation material for attaching with the first fixing part 22, and a second attaching part 25-2 at the other end of the thermal compensation material for attaching to the upper base plate 41. As shown in FIG. 4F, the second attaching part may be extended to reduce the adhesion gap with the first attaching part 25-1. Due to the required minimum length for the thermal compensation material, the width of the upper base plate 41 may be reduced by adjusting the distance between the first attaching part 25-1 and the second attaching part 25-2 rather than forming the attaching parts at the two ends of the thermal compensation material. Through this, it is possible to fabricate the temperature compensation module 20 with economic efficiency. The first attaching part 25-1 and the second attaching part 25-2 may be the same material as the first fixing part 22 and the upper base plate 41, and may be made of metal, plastic, silicon or silica-based materials.

For example, the first modified form of the temperature compensation module 20 is an extension integrated form, and it may be fabricated by simply cutting the planar substrate and may be a plate-type horizontal movement module that is easy to machine in order to change the shape. According to an embodiment, the base of the temperature compensation module 20 may be fabricated in a sufficient size to receive the entire AWG substrate, and through this, it is possible to assist the alignment and horizontal movement of the AWG substrate more precisely.

Figure 5:
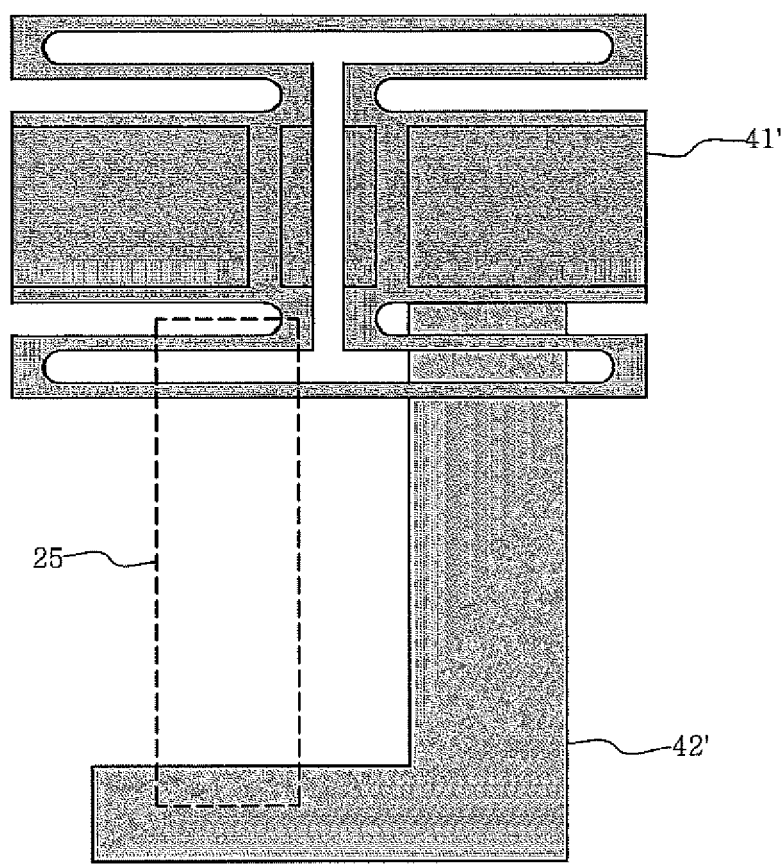
FIG. 5 illustrates the structure of a second modified form of a temperature compensation module according to an embodiment of the present disclosure.

FIG. 5 illustrates the structure of a second modified form of the temperature compensation module 20 according to an embodiment of the present disclosure.

Referring to FIG. 5, the second modified form of the temperature compensation module 20 includes an upper base plate 41' that is the same as the basic form of the base, and a lower base plate 42' that is fixed and attached to one surface of the second fixing part 23. According to an embodiment of the present disclosure, the upper base plate 41 may be attached on or below the AWG, and the lower base plate 42' may be attached to a surface opposite the second fixing part 23 of the upper base plate 41' where the AWG is attached. One end of the moving member 25 is fixed to the first fixing part 22, and the other end is fixed to the lower base plate 42'. According to another embodiment, the upper and lower base plates may be integrally formed as shown in FIG. 5.

Figure 6A:
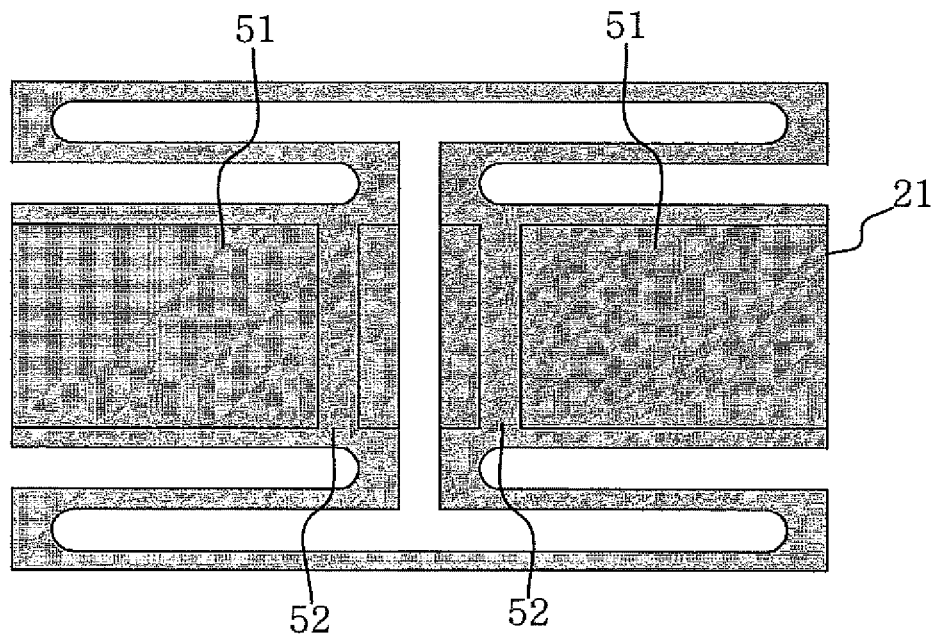
FIGS. 6A to 6C illustrate the top and side structure of a temperature compensation module according to an embodiment of the present disclosure.
Figure 6B:
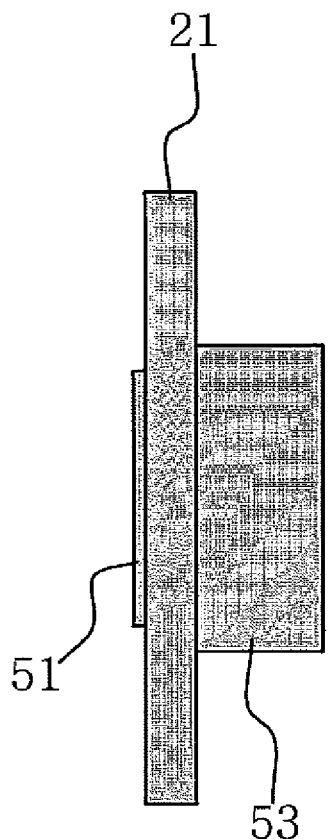
Figure 6C:
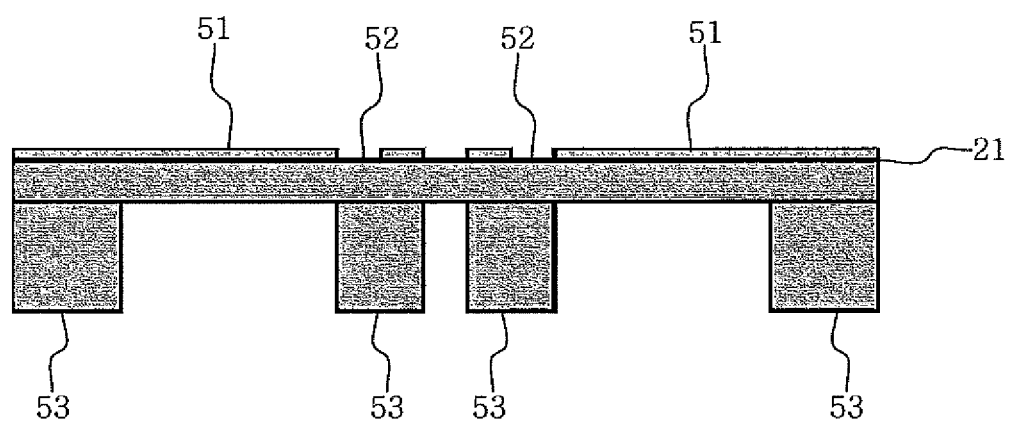

FIGS. 6A to 6C illustrate the top and side structure of the temperature compensation module 20 according to an embodiment of the present disclosure.

Referring to FIG. 6A, the base 21 may further include a slit 51 and a dam 52 structure on the upper surface to assist the attachment of the AWG substrate. According to an embodiment of the present disclosure, the first fixing part 22 and the second fixing part 23 of the base 21 may be fixed and attached to the first sub chip 10a including the input waveguide 1 of the AWG and the second sub chip 10b including the slab waveguide 2 respectively, and in this instance, a variety of fixing methods may be used. For example, when a liquid adhesive material such as epoxy is used, it is necessary to prevent the liquid adhesive material from flowing in regions other than the first fixing part 22 and the second fixing part 23. It is to prevent the problem that the elastic part 24 cannot perform the intrinsic function when attached to the AWG. To this is end, as shown in FIGS. 6A and 6C, the slit 51 and the dam 52 structure may be included on the upper surface of the base 21 to prevent the liquid adhesive material from flowing. The present disclosure does not necessarily include the slit 51 and the dam 52 structure, and the same goal may be achieved by precisely applying the adhesive material. Referring to FIGS. 6B and 6C, a slit 53 structure may be included on the lower surface of the base 21, and the lower base plate 42, 42' structure may be attached to prevent the liquid adhesive material from flowing.

Figure 7A:
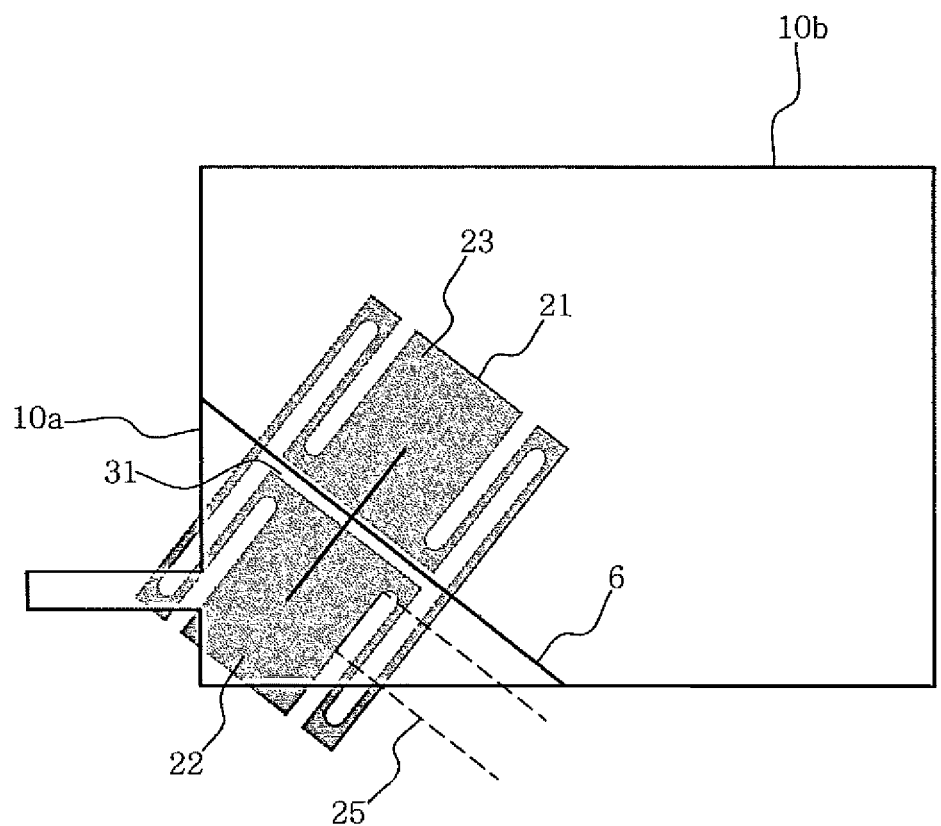
FIGS. 7A to 7C illustrate examples of AWGs with temperature compensation modules of various structures according to an embodiment of the present disclosure.
Figure 7B:
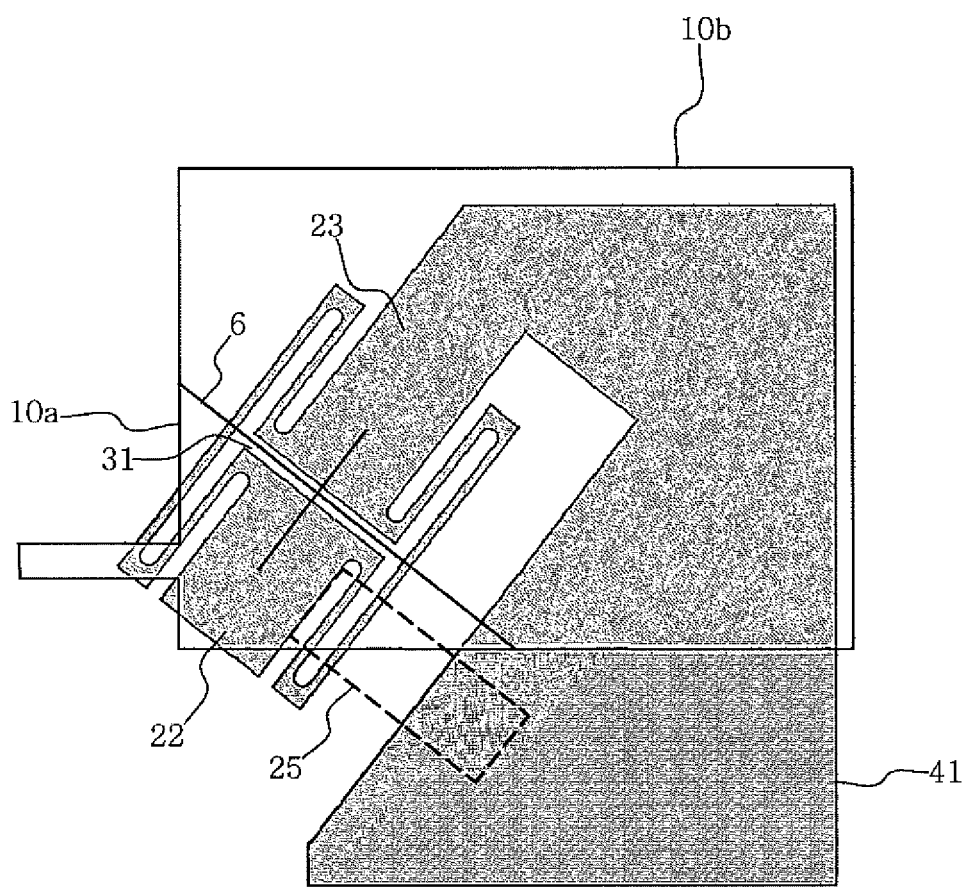
Figure 7C:
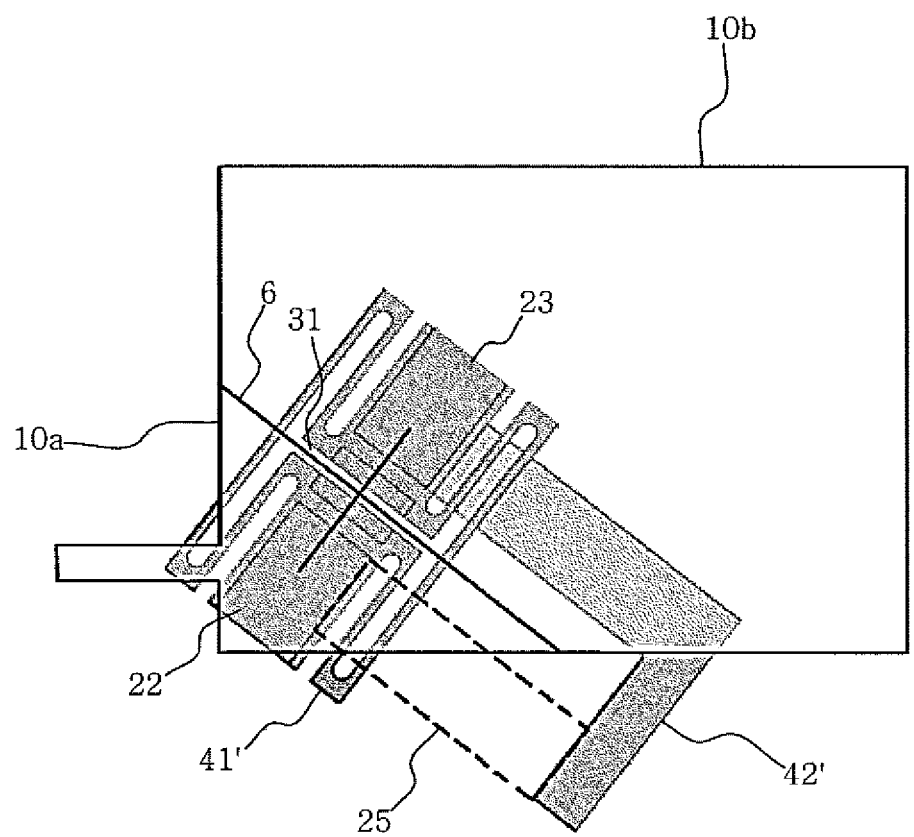

FIGS. 7A to 7C illustrate examples of the AWGs with the temperature compensation modules 20 of various structures according to an embodiment of the present disclosure.

Referring to FIG. 7A, the AWG with the basic form of the temperature compensation module 20 is shown. The first fixing part 22 of the base 21 is fixed to the first sub chip 10a of the AWG, and the second fixing part 23 is fixed to the second sub chip 10b of the AWG. The cutting plane 6 of the AWG for cutting into the two parts 10a, 10b is disposed in the hole 31 of the base 21 so that the first sub chip 10a is horizontally moved along the cutting plane 6 by the moving member 25 made of the thermal compensation material. Through this, the AWG with the basic form of the temperature compensation module 20 compensates for changes in the center wavelength with the changes in temperature, thereby achieving the athermal AWG.

Referring to FIG. 7B, the AWG with the first modified form of the temperature compensation module 20 is shown. The first fixing part 22 of the upper base plate 41 is fixed to the first sub chip 10a of the AWG, and the second fixing part 23 is fixed to the second sub chip 10b of the AWG. The cutting plane 6 of the AWG for cutting into the two parts 10a, 10b is disposed in the hole 31 of the upper base plate 41 so that the first sub chip 10a is horizontally moved along the cutting plane 6 by the moving member 25 made of the thermal compensation material. As shown in FIG. 4B, the moving member 25 may be disposed in the guide hole 43 to achieve linear expansion/contraction without interruption.

Referring to FIG. 7C, the AWG with the second modified form of the temperature compensation module 20 is shown. The first fixing part 22 of the upper base plate 41' is fixed to the first sub chip 10a of the AWG, and the second fixing part 23 is fixed to the second sub chip 10b of the AWG. The cutting plane 6 of the AWG for cutting into the two parts 10a, 10b is disposed in the hole 31 of the upper base plate 41' so that the first sub chip 10a is horizontally moved along the cutting plane 6 by the moving member 25 made of the thermal compensation material.

According to an embodiment of the present disclosure, the temperature compensation module 20 of FIGS. 7A to 7C is an extension integrated form, and it may be fabricated by simply cutting the planar substrate and may be a plate-type horizontal movement module that is easy to machine in order to change the shape. According to an embodiment, the base of the temperature compensation module 20 may be fabricated in a sufficient size to receive the entire AWG substrate, and through this, it is possible to assist the alignment and horizontal movement of the AWG substrate more precisely. In this instance, for example, the moving member 25 may be formed with a structure in which the moving member 25 is fixed with screws at two ends, or the moving member 25 itself may be fabricated in the shape of a large screw. Through the screw shape of the moving member 25, the moving member 25 may be fixed to the base in a simple manner, and the chip may be aligned to a desired location by adjusting the screw.

In the specific embodiments described above, the components included in the present disclosure are represented in singular or plural forms according to the presented specific embodiments. However, the singular or plural forms are selected suitably for the presented context for convenience of description, and the above-described embodiments are not limited to the components in singular or plural forms, and the component represented in plural form may be singular and the component in singular form may be plural.

While the specific embodiments have been described in the detailed description, various modifications may be made without departing from the technical spirit and scope connoted by a variety of embodiments. Therefore, the scope of the present disclosure should not be limited to the disclosed embodiments and should be defined by the appended claims and their equivalents.

The invention claimed is:

1. A temperature compensation module mounted in arrayed waveguide grating (AWG) to manually compensate for outside temperature changes, the temperature compensation module comprising:
    a base that is attached to the AWG; and
    a moving member that is attached to the base,
    wherein the base includes:
        a first fixing part that is attached to a first sub chip including an input waveguide of the AWG;
        a second fixing part that is attached to a second sub chip including an input slab waveguide of the AWG;
        a hole being a gap between the first fixing part and the second fixing part, the hole disposed to include a cutting plane within the gap, the cutting plane for separating the AWG into the first sub chip and the second sub chip; and
        a 'ㄹ'-shaped elastic part to assist a linear movement of the first fixing part and connect the first fixing part and the second fixing part, and
    the moving member is attached to the first fixing part to horizontally move the first sub chip of the AWG in a direction of reducing a change in center wavelength with a change in temperature.

2. The temperature compensation module according to claim 1, wherein the base is extended to a sufficient size to receive the entire AWG chip.

3. The temperature compensation module according to claim 1, wherein each of the first fixing part and the second fixing part includes:
    a slit being a protruding plane to apply an adhesive for fixing the AWG; and
    a dam having a recessed shape to isolate the slit to prevent the adhesive from flowing.

4. The temperature compensation module according to claim 1, wherein the base includes:
    an upper base plate that is attached to the AWG; and
    a lower base plate formed on a surface opposite a surface of the upper base plate where the AWG is attached, one end of the moving member being attached to the lower base plate.

5. The temperature compensation module according to claim 4, wherein the upper base plate and the lower base plate are integrally formed.

6. The temperature compensation module according to claim 4, wherein the lower base plate includes a guide hole for guiding a linear movement of the moving member.

7. The temperature compensation module according to claim 1, wherein the moving member is made of a material having a higher coefficient of thermal expansion than the base, and
    the base is made of one of metal, plastic, silicon and silica-based materials having a lower coefficient of thermal expansion than the moving member.

8. An athermal arrayed waveguide grating (AWG), comprising:
    an AWG planar substrate including an input waveguide, an input slab waveguide, an array waveguide, an output slab waveguide and an output waveguide,
    wherein a temperature compensation module is mounted on or below the planar substrate,
    the temperature compensation module includes a base that is attached to the AWG and a moving member that is attached to the base,
    the base includes a first fixing part and a second fixing part, each attached with the AWG and separated from each other, a hole being a gap between the first fixing part and the second fixing part, and a 'ㄹ'-shaped elastic part to assist a linear movement of the first fixing part and connect the first fixing part and the second fixing part, and
    the moving member is attached to the first fixing part to horizontally move in a direction of reducing a change in center wavelength with a change in temperature of the AWG.

9. The athermal AWG according to claim 8, wherein the planar substrate is separated into a first sub chip including the input waveguide and a second sub chip including the input slab waveguide by a cutting plane formed between the input waveguide and the input slab waveguide or inside the input slab waveguide.

10. The athermal AWG according to claim 9, wherein the first fixing part is attached to the first sub chip, and the second fixing part is attached to the second sub chip, and the moving member is attached to the first fixing part to allow the first sub chip to make a parallel movement along the cutting plane.

11. A method for manufacturing an athermal arrayed waveguide grating (AWG) using a temperature compensation module, comprising:
    preparing an AWG planar substrate including an input waveguide, an input slab waveguide, an array waveguide, an output slab waveguide and an output waveguide;
    placing the temperature compensation module on or below the AWG; and
    attaching the temperature compensation module to the AWG,
    wherein the temperature compensation module includes a base that is attached to the AWG and a moving member that is attached to the base,
    the base includes a first fixing part and a second fixing part, each attached with the AWG and separated from each other, a hole being a gap between the first fixing part and the second fixing part, and a '㠾'-shaped elastic part to assist a linear movement of the first fixing part and connect the first fixing part and the second fixing part, and the moving member is attached to the first fixing part to horizontally move in a direction of reducing a change in center wavelength with a change in temperature of the AWG.

12. The method for manufacturing an athermal AWG according to claim 11, wherein placing the temperature compensation module on or below the AWG comprises:

placing a cutting plane within the hole, the cutting plane for separating the AWG into a first sub chip including the input waveguide and a second sub chip including the input slab waveguide.

13. The method for manufacturing an athermal AWG according to claim 11, further comprising:

cutting between the input waveguide and the input slab waveguide or into the input slab waveguide to separate the AWG into a first sub chip including the input waveguide and a second sub chip including the input slab waveguide.

14. The method for manufacturing an athermal AWG according to claim 13, wherein attaching the temperature compensation module to the AWG comprises:

attaching the first fixing part to the first sub chip and the second fixing part to the second sub chip.

15. The method for manufacturing an athermal AWG according to claim 13, wherein attaching the temperature compensation module to the AWG comprises:

applying an adhesive to a slit, wherein the slit is a protruding plane from each of the first fixing part and the second fixing part; and attaching the slit of the first fixing part to the first sub chip and the slit of the second fixing part to the second sub chip, wherein each of the first fixing part and the second fixing part includes a dam having a recessed shape to isolate the slit to prevent the adhesive from flowing.

* * * * *